(12) United States Patent
Sano et al.

(10) Patent No.: US 7,230,612 B2
(45) Date of Patent: Jun. 12, 2007

(54) TOUCH PANEL DEVICE

(75) Inventors: Satoshi Sano, Kawasaki (JP); Takashi Katsuki, Kawasaki (JP); Yuji Takahashi, Kawasaki (JP); Fumihiko Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 10/352,857

(22) Filed: Jan. 29, 2003

(65) Prior Publication Data

US 2003/0234773 A1 Dec. 25, 2003

(30) Foreign Application Priority Data

Jun. 24, 2002 (JP) .............................. 2002-183594

(51) Int. Cl.
| | |
|---|---|
| G09G 5/00 | (2006.01) |
| G06F 3/043 | (2006.01) |
| G06K 11/06 | (2006.01) |
| G08C 21/00 | (2006.01) |
| H01L 41/04 | (2006.01) |
| H01L 41/18 | (2006.01) |
| H02N 2/00 | (2006.01) |

(52) U.S. Cl. ............... 345/177; 178/18.04; 310/313 A; 310/313 B; 310/313 C; 310/313 D; 310/313 R

(58) Field of Classification Search ................. 345/177
See application file for complete search history.

(56) References Cited

U.S. PATENT DOCUMENTS 4,602,183 A * 7/1986 Okamoto et al. ....... 310/313 B (Continued)

FOREIGN PATENT DOCUMENTS

EP 0 332 410 A2 9/1989

(Continued)

OTHER PUBLICATIONS

Platshon M: "Surface Acoustic Wave Technology Expands Uses of Touch-Screen" Computer Technology Review, Westworld Production Co., Los Angeles, US, vol. 77, No. 13(Sep. 21, 1987) pp. 18-21.

(Continued)

*Primary Examiner*—Sumati Lefkowitz
*Assistant Examiner*—Alexander S. Beck
(74) *Attorney, Agent, or Firm*—Westerman, Hattori, Daniels & Adrian, LLP.

(57) ABSTRACT

Surface acoustic waves are propagated in a lower-left oblique direction and a lower-right oblique direction from an excitation element located on the upper side of a non-piezoelectric substrate and then received by receiving elements located on the left side and the right side, while surface acoustic waves are propagated in an upper-left oblique direction and an upper-right oblique direction from an excitation element located on the lower side of the non-piezoelectric substrate and then received by the receiving elements located on the left side and the right side. Based on the received results at the two receiving elements, a position of an object in contact with the non-piezoelectric substrate is detected. The sensitivity in a region near the diagonal, which is influenced largely by propagation loss of the surface acoustic waves, is improved by increasing the widths of the electrode fingers of the excitation elements and/or the receiving elements, the number of pairs of the electrode fingers, or the aperture width of comb-like electrodes, according to an increase in the propagation distances of the surface acoustic waves, i.e., toward the region near the diagonal.

2 Claims, 22 Drawing Sheets

U.S. PATENT DOCUMENTS

| | | | |
|---|---|---|---|
| RE33,151 E | 1/1990 | Adler | |
| 4,908,542 A | 3/1990 | Solie | |
| 5,717,434 A * | 2/1998 | Toda | 345/177 |
| 5,767,608 A | 6/1998 | Toda | |
| 5,883,457 A | 3/1999 | Rinde et al. | |
| 5,886,452 A | 3/1999 | Toda | |
| 5,986,224 A | 11/1999 | Kent | |
| 5,994,817 A | 11/1999 | Toda | |
| 6,023,122 A * | 2/2000 | Liu et al. | 310/313 B |
| 6,078,315 A | 6/2000 | Huang | |
| 6,091,406 A | 7/2000 | Kambara et al. | |
| 6,426,583 B1 | 7/2002 | Onishi et al. | |
| 6,750,853 B2 | 6/2004 | Takahashi et al. | |
| 6,756,973 B2 | 6/2004 | Sano et al. | |
| 2003/0011577 A1 | 1/2003 | Katsuki et al. | |
| 2003/0038789 A1 | 2/2003 | Nakazawa et al. | |
| 2003/0234773 A1 | 12/2003 | Sano et al. | |
| 2004/0027342 A1 | 2/2004 | Katsuki et al. | |
| 2004/0104827 A1 | 6/2004 | Katsuki et al. | |
| 2005/0073505 A1 | 4/2005 | Katsuki et al. | |

FOREIGN PATENT DOCUMENTS

| | | |
|---|---|---|
| EP | 1 227 431 A2 | 7/2002 |
| EP | 1 260 937 A2 | 11/2002 |
| EP | 1 280 097 A2 | 1/2003 |
| EP | 1 306 797 A2 | 5/2003 |
| JP | 06-075688 | 3/1994 |
| JP | 06 384396 A | 12/1994 |
| JP | 07-210300 | 8/1995 |
| JP | 07273595 A * | 10/1995 |
| JP | 09-049994 | 2/1997 |
| JP | 10-055240 | 2/1998 |
| JP | 10-504414 | 4/1998 |
| JP | 10-163803 | 6/1998 |
| JP | 2002-222041 A | 8/2002 |

OTHER PUBLICATIONS

European Search Report dated Jan. 26, 2007, Application No. 03250422.7-2224.

* cited by examiner

A: PROPAGATION DISTANCE IS SHORT

B: PROPAGATION DISTANCE IS LONG (PROPAGATION DIRECTION)

TOUCH PANEL DEVICE

BACKGROUND OF THE INVENTION

The present invention relates to a touch panel device for detecting the contact of an object such as a finger and a pen with the touch panel device, and more particularly relates to a touch panel device for detecting the contact position of the object by detecting attenuation and cutoff of surface acoustic waves (SAWs) by using excitation elements and receiving elements, each constructed by forming electrodes on a piezoelectric body.

With the spread of computer systems, mainly personal computers, there has been used a device for inputting new information or giving various instructions to a computer system by pointing at a position on a display screen of a display device on which information is displayed by the computer system, with an object such as a finger and a pen. In order to perform an input operation with respect to the information displayed on the display screen of the display device of a personal computer or the like by a touching method, it is necessary to detect the contact position (indicated position) on the display screen with high accuracy.

Well known examples of touch panel device for detecting the contact position of an object such as a finger and a pen are a device using a resistance film, and a device using ultrasonic waves. In the former device using a resistance film, a change in the resistance of the resistance film caused by contact of the object with the resistance film is detected. This device has the advantage of low consumption of power, but has the problems in the aspects of the response time, detection performance and durability.

By contrast, in the device using ultrasonic waves, the contact position of the object is detected by propagating surface acoustic waves on a non-piezoelectric substrate, for example, and detecting attenuation of the surface acoustic waves caused by contact of the object such as a finger and a pen with the non-piezoelectric substrate. There has been developed a touch panel device that uses, as transducers for exciting and receiving surface acoustic waves, comb-like electrodes (IDTs: inter digital transducers) capable of being produced collectively using a photolithography technique. In this touch panel device, as each of the excitation element for exciting surface acoustic waves and the receiving element for receiving propagated surface acoustic waves, an element constructed by forming a comb-like electrode on a piezoelectric body in the form of a thin film is used.

FIG. 1 is an illustration showing the structure of such a conventional touch panel device using comb-like electrodes. In FIG. 1, the numeral 61 represents a rectangular non-piezoelectric substrate, and a plurality of excitation elements 62, each constructed by forming a comb-like electrode on a piezoelectric thin film, for exciting surface acoustic waves are arranged in a line on one end of each of the X-direction and Y-direction of the non-piezoelectric substrate 61. Moreover, a plurality of receiving elements 63, each constructed by forming a comb-like electrode on a piezoelectric thin film, for receiving surface acoustic waves are arranged in a line on the other end of each of the X-direction and Y-direction of the non-piezoelectric substrate 61 so that the receiving elements 63 face the excitation elements 62.

In this touch panel device, periodic signals are inputted to the excitation elements 62 to excite surface acoustic waves and propagate them on the non-piezoelectric substrate 61, and then the propagated surface acoustic waves are received by the receiving elements 63. Moreover, when an object such as a finger and a pen comes into contact with the propagation path of the surface acoustic waves on the non-piezoelectric substrate 61, the surface acoustic waves attenuate. Accordingly, it is possible to detect the presence or absence of contact of the object and the contact position by detecting whether or not the level of the received signals at the receiving elements 63 is attenuated.

Furthermore, in order to achieve continuous detection of the presence or absence of contact of an object and the contact position and increase the time difference to improve the resolution of the detected position, the present inventor et al. have proposed a touch panel device in which the excitation elements and receiving elements are disposed so as to propagate surface acoustic waves in oblique directions (diagonal directions) of the non-piezoelectric substrate.

FIG. 2 is an illustration showing the structure of an example of such a touch panel device (hereinafter referred to as the "first prior art example"). FIG. 3 is an enlarged sectional view of FIG. 2. In FIG. 2, the numeral 71 represents a rectangular non-piezoelectric substrate, and a center portion enclosed by an alternate long and short dashed line is a detection region 71a capable of detecting the contact position.

In a frame region 71b outside the detection region 71a, which is a peripheral section of the non-piezoelectric substrate 71, excitation elements 72 are disposed on the upper side and lower side of the substrate 71, while receiving elements 73 are positioned on the left side and right side thereof. FIG. 4 is a partial cross sectional view of the excitation element 72 or the receiving element 73, and the excitation element 72 or the receiving element 73 is constructed by forming a comb-like electrode 75 on a piezoelectric body 74 in the form of a thin film. This comb-like electrode 75 comprises facing bus electrodes 77 and a plurality of electrode fingers 78 which are extended from the bus electrodes 77 in turns and bent in the middle. The structure having such electrode fingers 78 bent in the middle is also called a "chevron structure". According to this structure, lines of a plurality of electrode fingers 78 tilted in two directions from the facing direction of the bus electrodes 77 are formed, and thereby realizing excitation of surface acoustic waves in two directions and reception of surface acoustic waves from two directions.

Terminals 79 for input and ground are provided so that they are connected to the bus electrodes 77 of the upper-side and lower-side excitation elements 72. Moreover, terminals 79 for output and ground are provided so that they are connected to the bus electrodes 77 of the left-side and right-side receiving elements 73. Further, drawn-round wires 80 are connected to the terminals 79, respectively.

In such a structure, surface acoustic waves are excited in two directions by the excitation elements 72, and the excited surface acoustic waves are propagated in two diagonal directions of the non-piezoelectric substrate 71 and then received by the receiving elements 73. Based on the received results, the presence or absence of contact of an object and the contact position are detected in the same manner as in the conventional example shown in FIG. 1.

Furthermore, the present inventor et al. have proposed a touch panel device comprising a film-like piezoelectric body, a comb-like electrode formed on one surface of the piezoelectric body, and a plate electrode formed on the other surface of the piezoelectric body (hereinafter referred to as the "second prior art example"). In this second prior art example, each of the excitation element and receiving element is constructed by forming a comb-like electrode produced by extending a plurality of electrode fingers which are bent in the middle and have the same polarity on one surface of the piezoelectric body, instead of a comb-like electrode in which electrode fingers of different polarities are placed in turns, and by forming a plate electrode with a polarity different from the comb-like electrode on the other surface of the piezoelectric body. Compared to the first prior art example which requires a width of two lines of bus electrodes on each side due to the presence of the electrodes of different polarities on the same plane, the second prior art example requires only a width of one line of bus electrode, thereby making it possible to narrow the frame region. In addition, since there is no need to provide electrodes of different polarities on the same plane, it is possible to improve the degree of freedom in design of the drawn-round wires, etc. This electrode structure of the second prior art example is also called an "SPT (Single Phased Transducer) electrode structure".

In the first and second prior art examples of propagating surface acoustic waves in diagonal directions, the propagation distance of the surface acoustic waves is not uniform. Since the surface acoustic waves are attenuated by the propagation, a high-level received signal is obtained by the receiving element in a region with a short propagation distance between the excitation element and the receiving element. However, in a region with long propagation distance between the excitation element and the receiving element (region near the diagonal of the substrate), the surface acoustic wave is attenuated considerably and there is a problem that a high-level received signal is not obtained by the receiving element. As a result, the S/N ratio in the region near the diagonal decreases and high detection accuracy is not obtained for the detections of presence or absence of contact of an object and the contact position, and thus there is room for improvement.

BRIEF SUMMARY OF THE INVENTION

It is a main object of the present invention to provide a touch panel device capable of improving the SIN ratio in a region near the diagonal where the influence of propagation loss of the surface acoustic waves is large, and improving the accuracy of detecting the presence or absence of contact of an object and the contact position.

A touch panel device according to the present invention comprises excitation elements for exciting surface acoustic waves and receiving elements for receiving surface acoustic waves, disposed at peripheral sections in diagonal directions of a rectangular substrate to form pairs, and propagates surface acoustic waves between the excitation elements and the receiving elements in diagonal directions on the substrate so as to detect the position of an object in contact with the substrate.

In a touch panel device of the first aspect, the excitation elements and the receiving elements have comb-like electrode fingers, and the widths of the comb-like electrode fingers of the excitation elements and/or the receiving elements are set according to the lengths of propagation distances of the surface acoustic waves. In the touch panel device of the first aspect, the widths of the comb-like electrode fingers are varied according to the propagation distances of the surface acoustic waves, i.e., the widths of the comb-like electrode fingers are increased in a region with long surface acoustic propagation distance (region near the diagonal) so as to achieve maximum excitation efficiency, while the widths of the comb-like electrode fingers are decreased in a region with short surface acoustic propagation distance. Consequently, a high S/N ratio is ensured in the region with long propagation distance (region near the diagonal) where the influence of propagation loss of the surface acoustic waves becomes larger.

In a touch panel device of the second aspect, the excitation elements and the receiving elements have comb-like electrode fingers, and the number of pairs of the comb-like electrode fingers of the excitation elements and/or the receiving elements is set according to the lengths of propagation distances of the surface acoustic waves. In the touch panel device of the second aspect, the number of pairs of the electrode fingers is varied according to the propagation distances of the surface acoustic waves, i.e., the number of pairs of the electrode fingers is increased in a region with long surface acoustic wave propagation distance (region near the diagonal), while the number of pairs of the electrode fingers is decreased in a region with short surface acoustic wave propagation distance. Therefore, since the S/N ratio is determined by the sensitivity proportional to the number of pairs, a high S/N ratio is ensured in the region with long propagation distance (region near the diagonal) where the influence of propagation loss of the surface acoustic waves becomes larger.

In a touch panel device of the third aspect, each of the excitation elements and the receiving elements comprises a comb-like electrode having a plurality of electrode fingers, and the aperture width of the comb-like electrode of the excitation elements and/or the receiving elements is set according to the lengths of propagation distances of the surface acoustic waves. In the touch panel device of the third aspect, the aperture width of the comb-like electrode is varied according to the propagation distances of the surface acoustic waves, i.e., the aperture width of the comb-like electrode is increased in a region with long surface acoustic wave propagation distance, while the aperture width of the comb-like electrodes is decreased in a region with short propagation distance. Therefore, since the S/N ratio is determined by the sensitivity proportional to the aperture width, a high S/N ratio is ensured in the region with long propagation distance (region near the diagonal) where the influence of propagation loss of the surface acoustic waves becomes larger.

In a touch panel device of the fourth aspect, the excitation elements and the receiving elements has a plurality of terminals at different positions for connection to an external device, and the terminal on a side where the propagation distance of the surface acoustic waves is longer is selectively used. In the touch panel device of the fourth aspect, an excitation signal is inputted or a received signal is outputted through the terminal provided in a region with long surface acoustic wave propagation distance (region near the diagonal). Therefore, since the transmission loss due to the electrode resistance in the region with long propagation distance where the influence of the propagation loss of the surface acoustic wave becomes larger (region near the diagonal) is reduced compared to other regions, a high SIN ratio is ensured in the region with long propagation distance (region near the diagonal).

A touch panel device of the fifth aspect further comprises additional excitation elements for exciting surface acoustic waves and additional receiving elements for receiving surface acoustic waves, disposed at four corners of the substrate to form pairs. In the touch panel device of the fifth aspect, at the four corners of the substrate, excitation elements for exciting surface acoustic waves and receiving elements for receiving surface acoustic waves are further provided to form pairs in the diagonal directions. Therefore, since the signal strength in the region with long propagation distance where the influence of the propagation loss of the surface acoustic wave becomes larger (region near the diagonal) is increased, a high S/N ratio is ensured in the region with long propagation distance (region near the diagonal).

A touch panel device of the sixth aspect is based on any one of the first through fifth aspects, wherein each of the excitation elements and the receiving elements comprises a film-like piezoelectric body, a comb-like electrode formed on one surface of the piezoelectric body, and a plate electrode formed on the other surface of the piezoelectric body. In the touch panel device of the sixth aspect, each of the excitation elements and receiving elements is constructed by forming a comb-like electrode composed of a plurality of electrode fingers having the same polarity on one surface of the piezoelectric body and forming a plate electrode with a polarity different from the comb-like electrode on the other surface of the piezoelectric body. It is therefore possible to narrow the frame region, improve the degree of freedom in design of the electrodes, and easily ensure a high S/N ratio in the region with long propagation distance (region near the diagonal) in the first through fifth aspects.

The above and further objects and features of the invention will more fully be apparent from the following detailed description with accompanying drawings.

DETAILED DESCRIPTION OF THE INVENTION

The following description will explain the present invention in detail with reference to drawings illustrating some embodiments thereof. In the following example, the application of the present invention to a touch panel device of the second prior art example is explained. First, the basic structure of the second prior art example will be described in detail.

Figure 5:
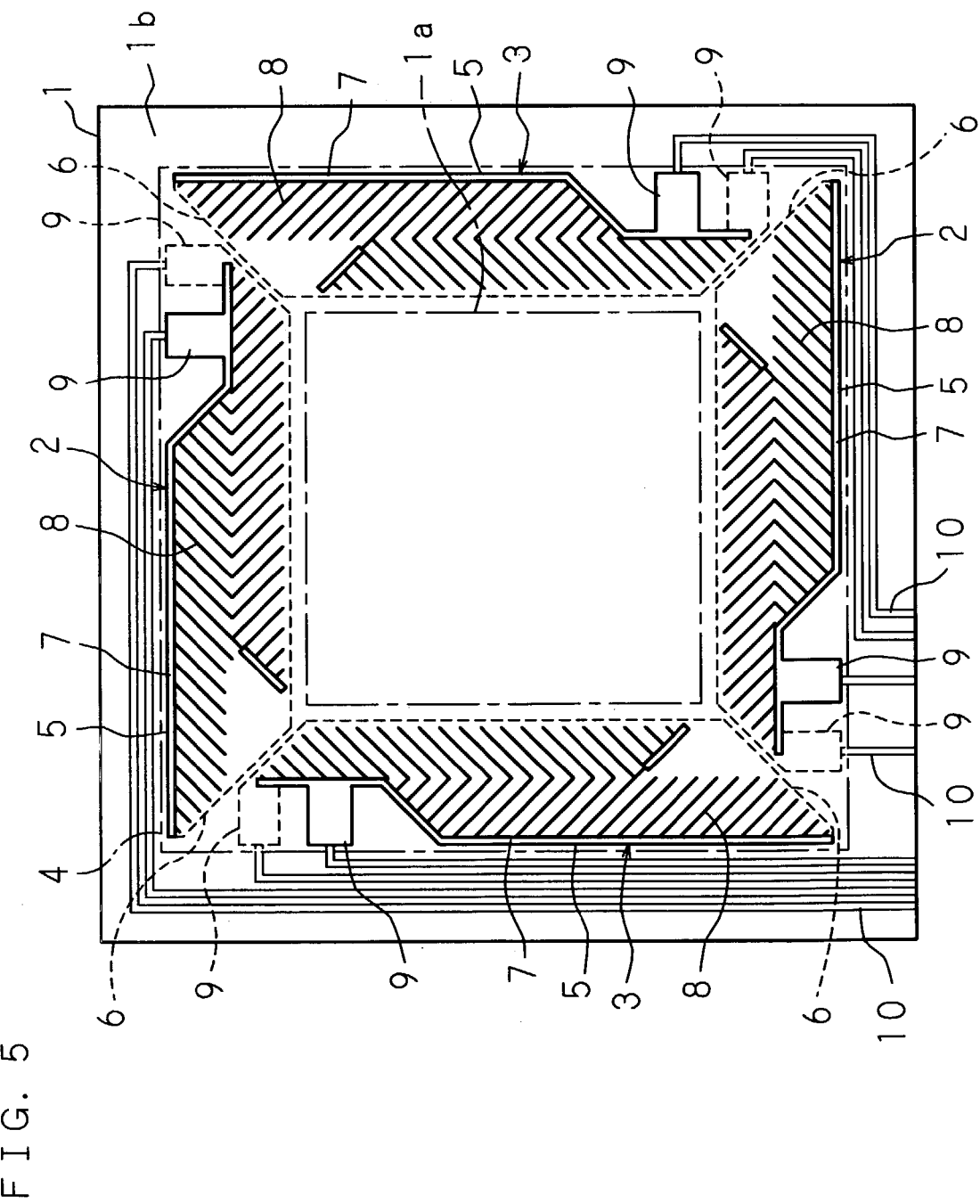
FIG. 5 is an illustration showing the structure of a touch panel device (the second prior art example) having an SPT electrode structure to which the present invention is applied.
Figure 6:
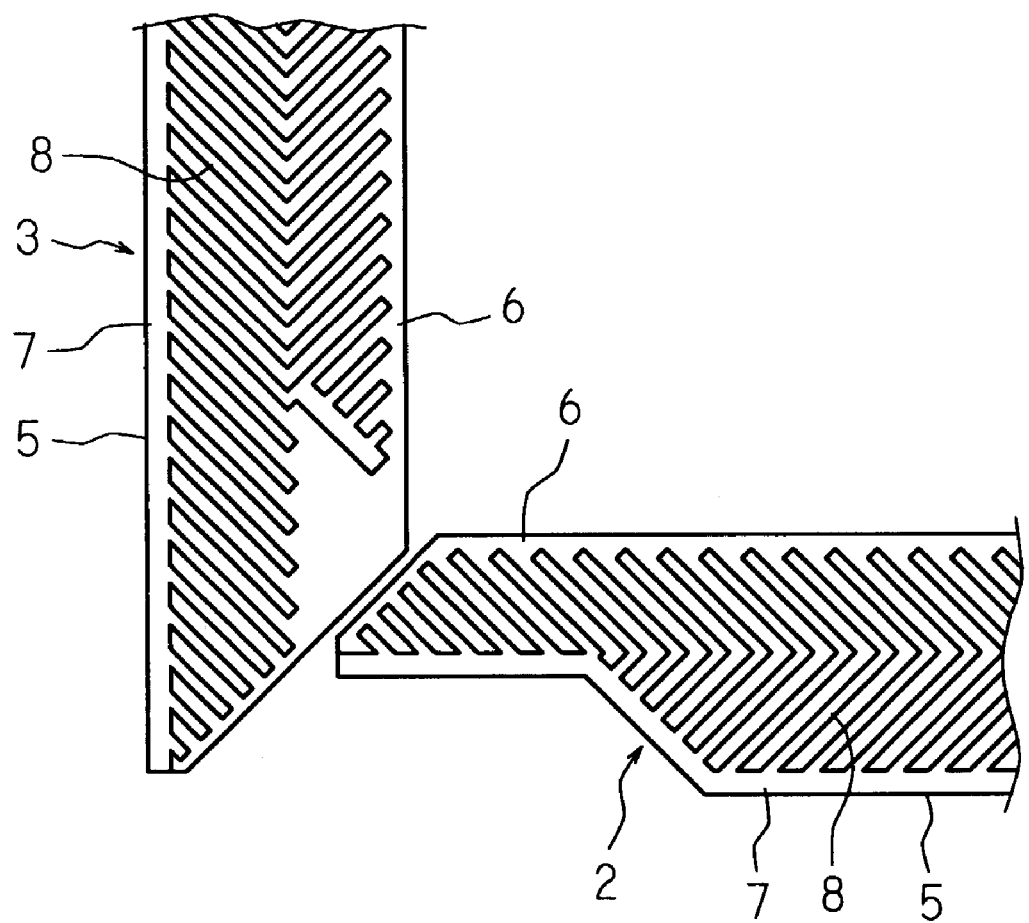
FIG. 6 is an enlarged sectional view of the touch panel device shown in FIG. 5.

FIG. 5 is an illustration showing the structure of the touch panel device of the second prior art example having an SPT electrode structure to which the present invention is applied, and FIG. 6 is an enlarged sectional view of FIG. 5. In FIG. 5, the numeral 1 represents a rectangular non-piezoelectric substrate which is made of a glass material, for example, and capable of propagating surface acoustic waves, and a center portion enclosed by an alternate long and short dash line is a detection region 1a capable of detecting a contact position. Excitation elements 2 for exciting surface acoustic waves in two directions are provided on the upper side and lower side of a frame region 1b outside the detection region 1a, which is a peripheral section of the non-piezoelectric substrate 1, and receiving elements 3 for receiving surface acoustic waves from two directions are provided on the left side and the right side thereof.

Figure 7:
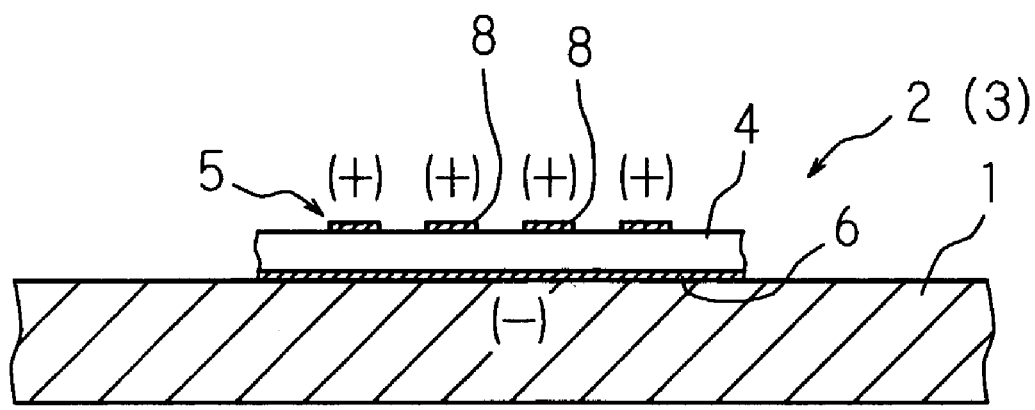
FIG. 7 is a partial cross sectional view of an excitation element or a receiving element of the touch panel device shown in FIG. 5.

These excitation elements 2 and receiving elements 3 have similar structures. FIG. 7 is a partial cross sectional view of the excitation element 2 or receiving element 3. The excitation element 2 or receiving element 3 is constructed by forming a comb-like electrode 5 on one surface (front surface) of a piezoelectric body 4 in the form of a thin film made of AlN or ZnO, for example, and forming a plate electrode (solid electrode) 6 on the other surface (rear surface) thereof. As shown in FIG. 5, the comb-like electrode 5 on the front surface comprises one line of bus electrode 7, and a plurality of electrode fingers 8 which are connected to the bus electrode 7 and bent in the middle into V shape. Note that, in FIG. 5, the plate electrode 6 is shown by a broken line, and the installation range of the piezoelectric body 4 is indicated by an alternate long and short dash line.

Such a comb-like electrode 5 and plate electrode 6 are connected to external circuits (an oscillation circuit, receiving level detection circuit, etc.). Terminals 9 for input are provided and connected to the comb-like electrodes 5 (bus electrodes 7) of the upper-side and lower-side excitation elements 2, and terminals 9 for ground are provided and connected to the plate electrodes 6 of these excitation elements 2. Moreover, terminals 9 for output are provided and connected to the comb-like electrodes 5 (bus electrodes 7) of the left-side and right-side receiving elements 3, and terminals 9 for ground are provided and connected to the plate electrodes 6 of these receiving elements 3. Further, drawn-round wires 10 are connected to the respective terminals 9.

In such a structure, by applying periodical excitation signals between the comb-like electrodes 5 and the plate electrodes 6, surface acoustic waves are excited in two directions by the excitation elements 2, and the excited surface acoustic waves are propagated in two diagonal directions of the non-piezoelectric substrate 1 and received by the receiving elements 3. More specifically, the surface acoustic waves from the upper-side excitation element 2 are propagated in a lower-left oblique direction and a lower-right oblique direction and then received by the left-side and right-side receiving elements 3, while the surface 5 acoustic waves from the lower-side excitation element 2 are propagated in an upper-left oblique direction and an upper-right oblique direction and then received by the left-side and right-side receiving elements 3.

Here, when an object such as a finger and a pen comes into contact with the propagation path of surface acoustic waves on the non-piezoelectric substrate 1, the surface acoustic waves attenuate. Therefore, by detecting the presence or absence of attenuation in the level of the received signals at the two receiving elements 3, it is possible to detect the presence or absence of contact of the object and the contact position.

In this example, each of the excitation elements 2 and the receiving elements 3 are constructed by forming the comb-like electrode 5 composed of a plurality of electrode fingers 8 of the same polarity on the front surface of the piezoelectric body 4 and forming the plate electrode 6 with a polarity different from the electrode fingers 8 on the rear surface of the piezoelectric body 4 (see FIG. 7). Therefore, compared to the first prior art example that requires a width of two lines of bus electrodes 77 on each side due to the presence of electrodes of different polarities on the same plane, only a width of one line of bus electrode 7 is necessary, and consequently the frame region 1b can be narrowed. Moreover, since there is no need to dispose electrodes of different polarities on the same plane, it is possible to allow free design.

Besides, when the same excitation frequency is used, in the first prior art example, the width of the electrode finger 78 is ¼ of the wavelength of the surface acoustic wave. Whereas, in the present example, the width of the electrode finger 8 can be only ½ of the wavelength of the surface acoustic wave. It is therefore possible to relax the requirement for the fineness of patterning when manufacturing the electrodes, and more easily manufacture the electrode fingers compared to the first prior art example. As a result, it becomes possible to manufacture the electrodes at low costs using methods such as a liftoff method and a conductive material screen printing method.

The following description will explain a specific technique of the present invention, for improving the S/N ratio in a region with long surface acoustic wave propagation distance, i.e., a region near the diagonal.

(First Embodiment)

Figure 8:
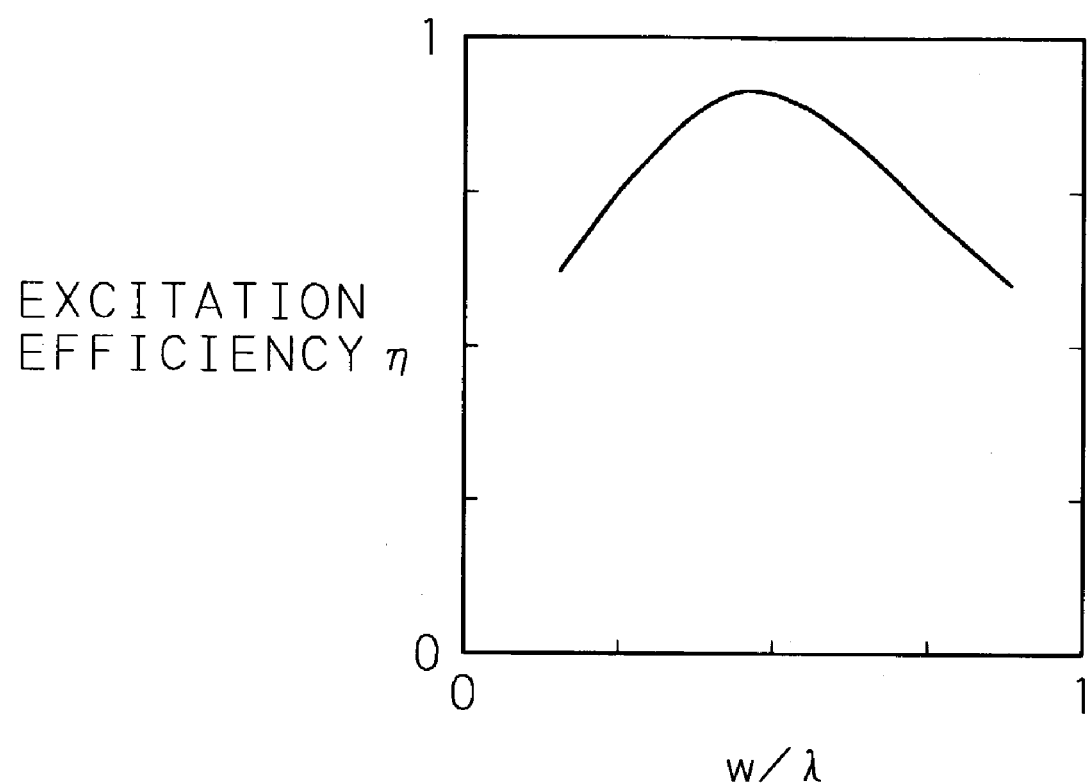
FIG. 8 is a graph showing the excitation efficiency of the touch panel device having the SPT electrode structure.

In the first embodiment, the sensitivity in a region near the diagonal is improved by varying the widths of the electrode fingers 8 according to the propagation distances of the surface acoustic waves. FIG. 8 is a graph showing the excitation efficiency in the touch panel device having the SPT electrode structure, wherein the abscissa indicates a ratio w/λ of the width (w) of the electrode finger 8 to the pitch (λ) of the electrode fingers 8, while the ordinate indicates excitation efficiency η. The maximum excitation efficiency is exhibited when w/λ takes a value near 0.4 to 0.5.

In view of the characteristics of the excitation efficiency as shown in FIG. 8, the comb-like electrodes 5 of the excitation elements 2 and receiving elements 3 are designed so that excitation efficiency corresponding to the need is added to each of the channels having different surface acoustic wave propagation distances. The pitch of the electrode fingers 8 can not be changed because a change thereof causes variations in the frequency of the surface acoustic waves. Therefore, the width of each electrode finger 8 is variably set.

Figure 9:
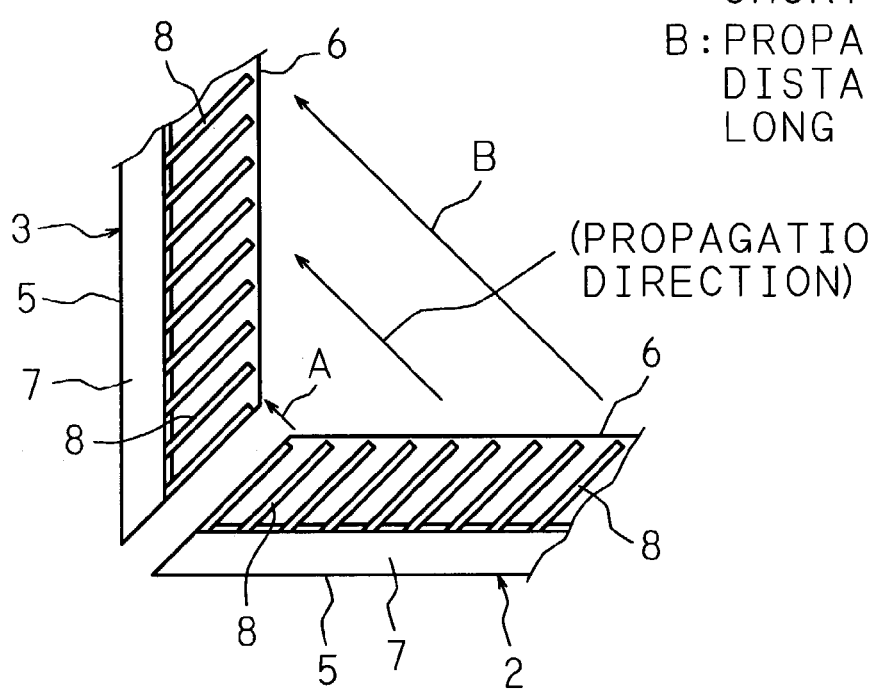
FIG. 9 is an illustration showing the electrode structure of a part of a touch panel device of the first embodiment.

FIG. 9 is an illustration showing the electrode structure of a part of the touch panel device of the first embodiment. According to an increase in the propagation distance, the widths of the electrode fingers 8 extending from the bus electrodes 7 of the comb-like electrodes 5 of the excitation element 2 and receiving element 3 are made wider sequentially. Further, the width of each electrode finger 8 is set so that maximum excitation efficiency is obtained in a region near the diagonal where the propagation distance is longest. Accordingly, it becomes possible to realize a high S/N ratio even in a region near the diagonal where large propagation loss is caused.

When burst waves of an equal center frequency are used as an excitation system, since the sensitivity is improved by the addition effect, it is more effective to set the widths of the electrode fingers 8 in such a manner on the transmission side (excitation elements 2).

(Second Embodiment)

In the second embodiment, the sensitivity in the region near the diagonal is improved by varying the number of pairs of the electrode fingers 8 and/or the aperture width of the comb-like electrode 5, according to the propagation distances of the surface acoustic waves.

(Second Embodiment: First Example)

Figure 10:
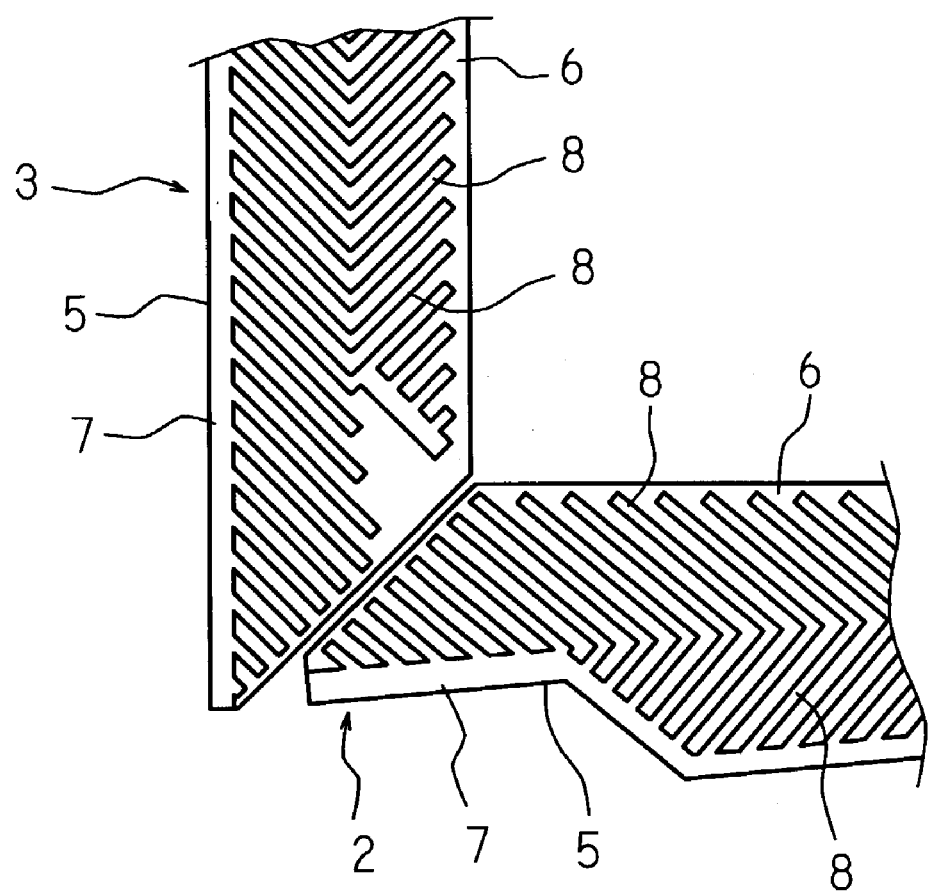
FIG. 10 is an illustration showing the electrode structure of a part of a touch panel device of the first example of the second embodiment.

FIG. 10 is an illustration showing the electrode structure of a part of a touch panel device of the first example of the second embodiment. It is clear from a comparison with FIG. 6 that, as the surface acoustic wave propagation distance increases, the number of pairs of the electrode fingers 8 extending from the bus electrodes 7 of the comb-like electrodes 5 of the excitation element 2 and receiving element 3 is gradually increased and the aperture width of the comb-like electrode 5 is gradually increased. Moreover, in a region with particularly short surface acoustic wave propagation distance, the number of pairs of the electrode fingers 8 is decreased and the aperture width of the comb-like electrode 5 is narrowed.

With such a structure of the comb-like electrode 5 (electrode fingers 8), it is possible to reduce the influence of diffraction at least a little and increase the strength of the received signal at the last end by using the addition effect during the excitation and receiving. Consequently, it becomes possible to realize a high SIN ratio even in the region near the diagonal where the propagation distance is longest.

(Second Embodiment: Second Example)

Figure 11:
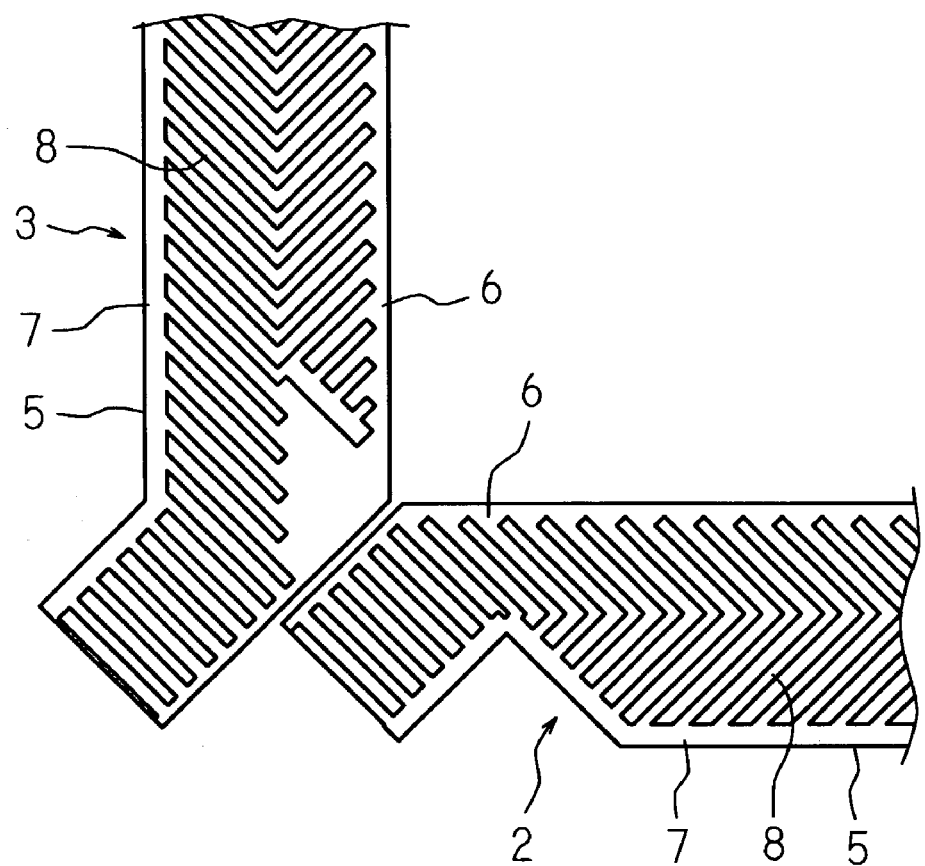
FIG. 11 is an illustration showing the electrode structure of a part of a touch panel device of the second example of the second embodiment.

FIG. 11 is an illustration showing the electrode structure of a part of a touch panel device of the second example of the second embodiment. It is clear from a comparison with FIG. 6 that, in a region with the longest surface acoustic wave propagation distance between the excitation element 2 and the receiving element 3, by extending the electrode fingers 8 to the outside, the number of pairs of the electrode fingers 8 is increased without changing the aperture width of the comb-like electrode 5.

With such a structure of the comb-like electrode 5 (electrode fingers 8), it is possible to increase the signal strength while keeping an apparent aperture. Consequently, it becomes possible to realize a high SIN ratio even in the region near the diagonal where the propagation distance is longest.

(Second Embodiment: Third Example)

Figure 12:
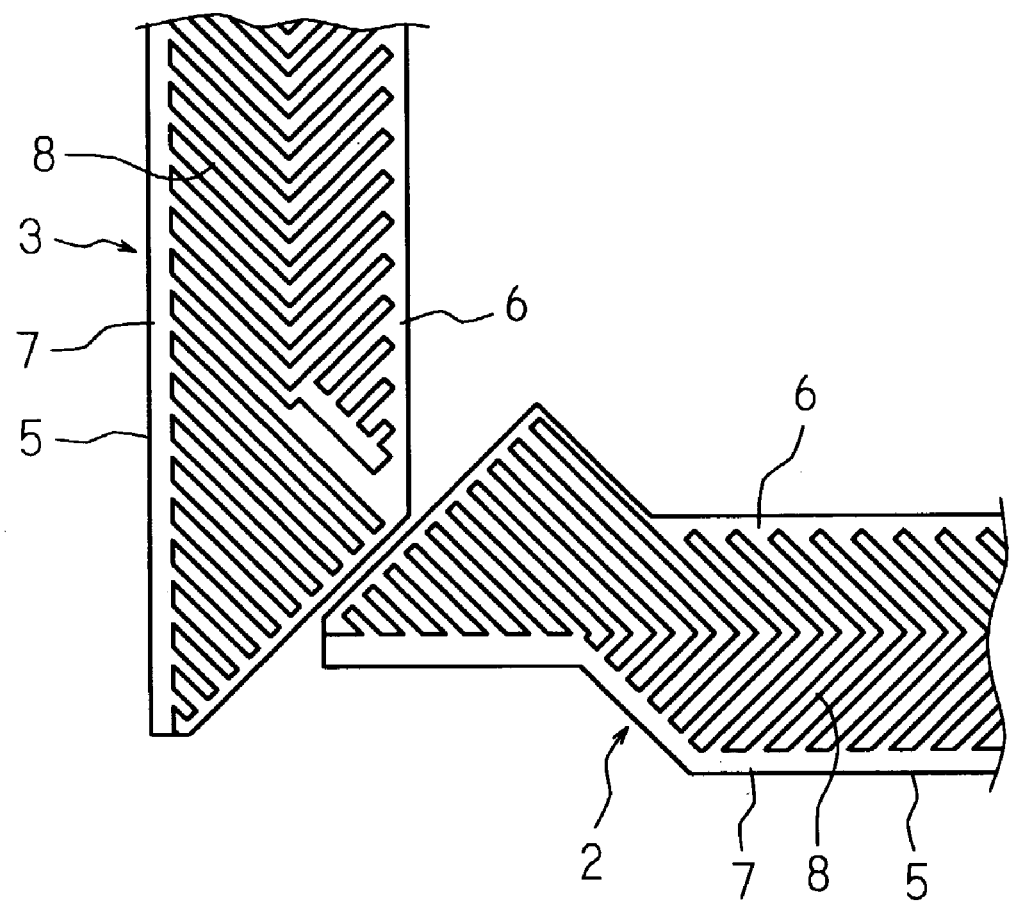
FIG. 12 is an illustration showing the electrode structure of a part of a touch panel device of the third example of the second embodiment.

FIG. 12 is an illustration showing the electrode structure of a part of a touch panel device of the third example of the second embodiment. It is clear from a comparison with FIG. 6 that, in the region with the longest surface acoustic wave propagation distance between the excitation element 2 and the receiving element 3, by extending the electrode fingers 8 to the inside, the number of pairs of the electrode fingers 8 is increased without changing the aperture width of the comb-like electrode 5.

With such a structure of the comb-like electrode 5 (electrode fingers 8), it is possible to increase the signal strength while keeping an apparent aperture. Consequently, it becomes possible to realize a high S/N ratio even in the region near the diagonal where the propagation distance is longest.

(Second Embodiment: Fourth Example)

Figure 13:
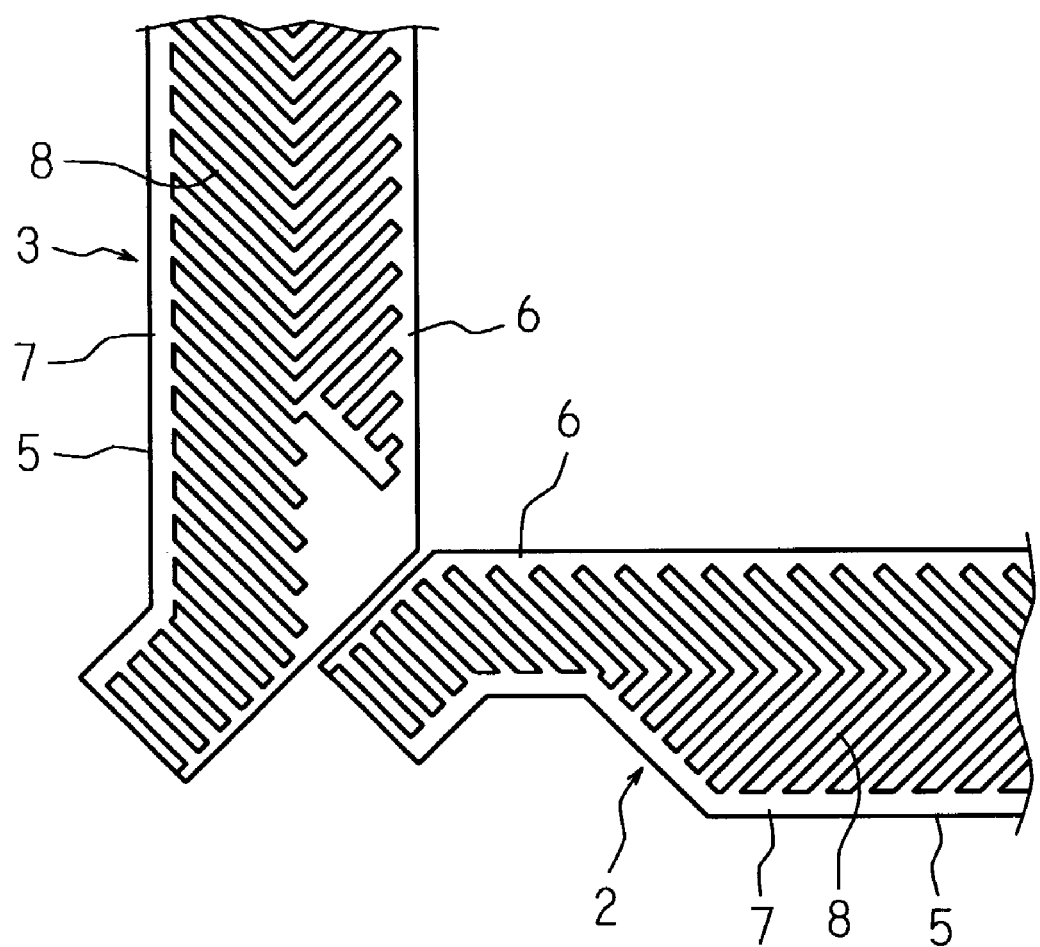
FIG. 13 is an illustration showing the electrode structure of a part of a touch panel device of the fourth example of the second embodiment.

FIG. 13 is an illustration showing the electrode structure of a part of a touch panel device of the fourth example of the second embodiment. The fourth example is an example in which the electrode fingers 8 are extended to the outside like the second example, but the extended amount is small compared to the second example. In order to increase the sensitivity by only a necessary amount, the extended portion of the electrode fingers 8 is provided in only a range sufficient for the need.

In the first through fourth examples, the extended portion of the electrode fingers 8 is provided so as to improve the sensitivity in a region with long propagation distance (region near the diagonal). However, in the case where extended portions of the same area are provided on both the transmission side (excitation element 2) and the receiving side (receiving element 3), when the extended portion is provided on the transmission side (excitation element 2), since a region where the apparent number of pairs of the electrode fingers 8 is increased by the addition effect of burst waves becomes larger, it is possible to design higher excitation efficiency. In other words, on the receiving side (receiving element 3), the receiving efficiency is determined by the structure, but, on the transmission side (excitation element 2), the excitation efficiency can be increased by improving oscillation such as excitation of burst waves. Hence, by providing the extended portion of the electrode fingers 8 on the transmission side (excitation element 2), a higher installation effect (an improvement in the sensitivity in the region near the diagonal) can be obtained.

However, when the extended portion of the electrode fingers 8 is provided on the transmission side (excitation element 2), there is a possibility of receiving large influence of diffraction, and therefore care must be taken. Accordingly, when increasing the sensitivity to a small degree, it is preferable to provide the extended portion of the electrode fingers 8 only on the receiving side (receiving element 3).

(Third Embodiment)

Next, the entire structure of a touch panel device having the extended portion of the electrode fingers 8 will be explained.

(Third Embodiment: First Example)

Figure 14:
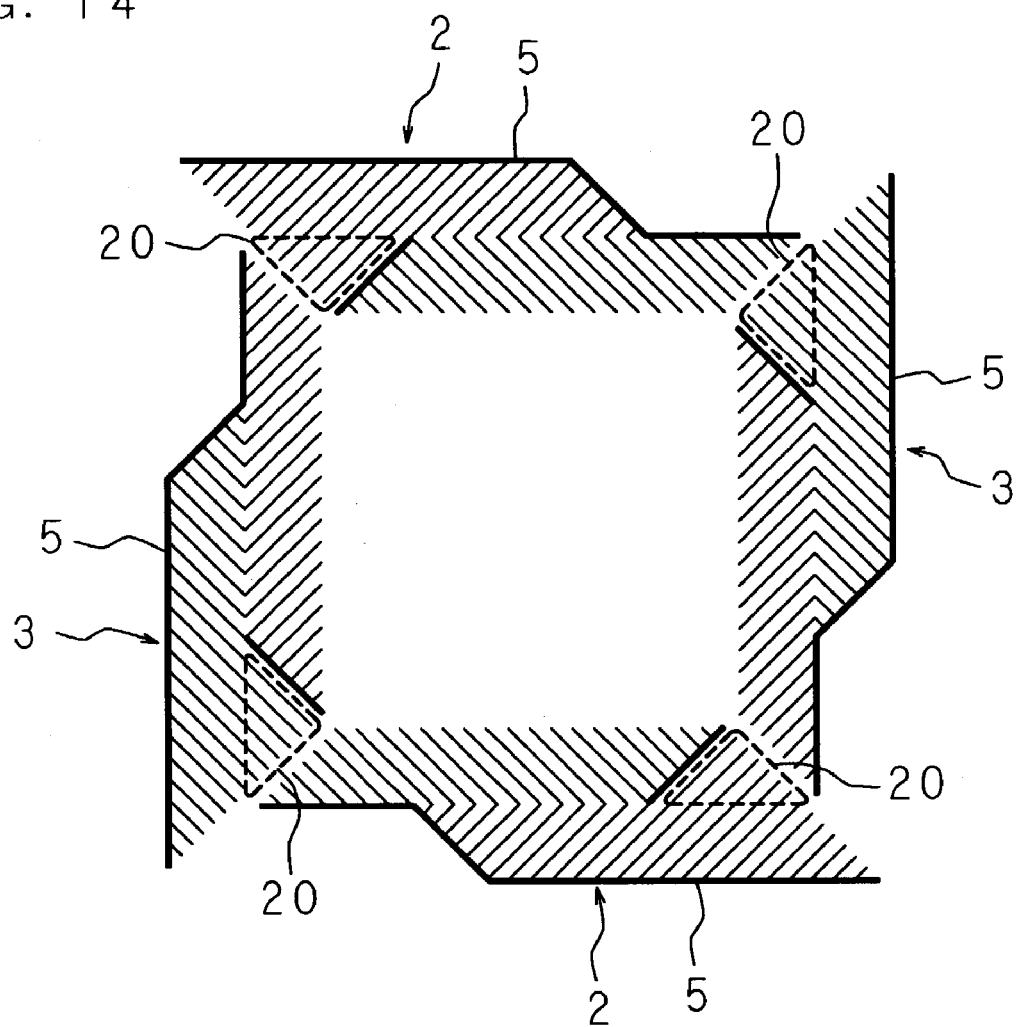
FIG. 14 is a schematic illustration of a touch panel device of the first example of the third embodiment.

FIG. 14 is a schematic view of a touch panel device of the first example of the third embodiment. In this example, for each of the excitation elements 2 and receiving elements 3, one extended portion 20 of the electrode fingers 8 is provided inside the comb-like electrode 5 by effectively using empty space. More specifically, in a region where surface acoustic waves are propagated from the upper-side excitation element 2 to the right-side receiving element 3, the extended portion 20 is provided inside the comb-like electrode 5 of the upper-side excitation element 2. In a region where surface acoustic waves are propagated from the upper-side excitation element 2 to the left-side receiving element 3, the extended portion 20 is provided inside the comb-like electrode 5 of the left-side receiving element 3. In a region where surface acoustic waves are propagated from the lower-side excitation element 2 to the right-side receiving element 3, the extended portion 20 is provided inside the comb-like electrode 5 of the right-side receiving element 3. In a region where surface acoustic waves are propagated from the lower-side excitation element 2 to the left-side receiving element 3, the extended portion 20 is provided inside the comb-like electrode 5 of the lower-side excitation element 2.

(Third Embodiment: Second Example)

Figure 15:
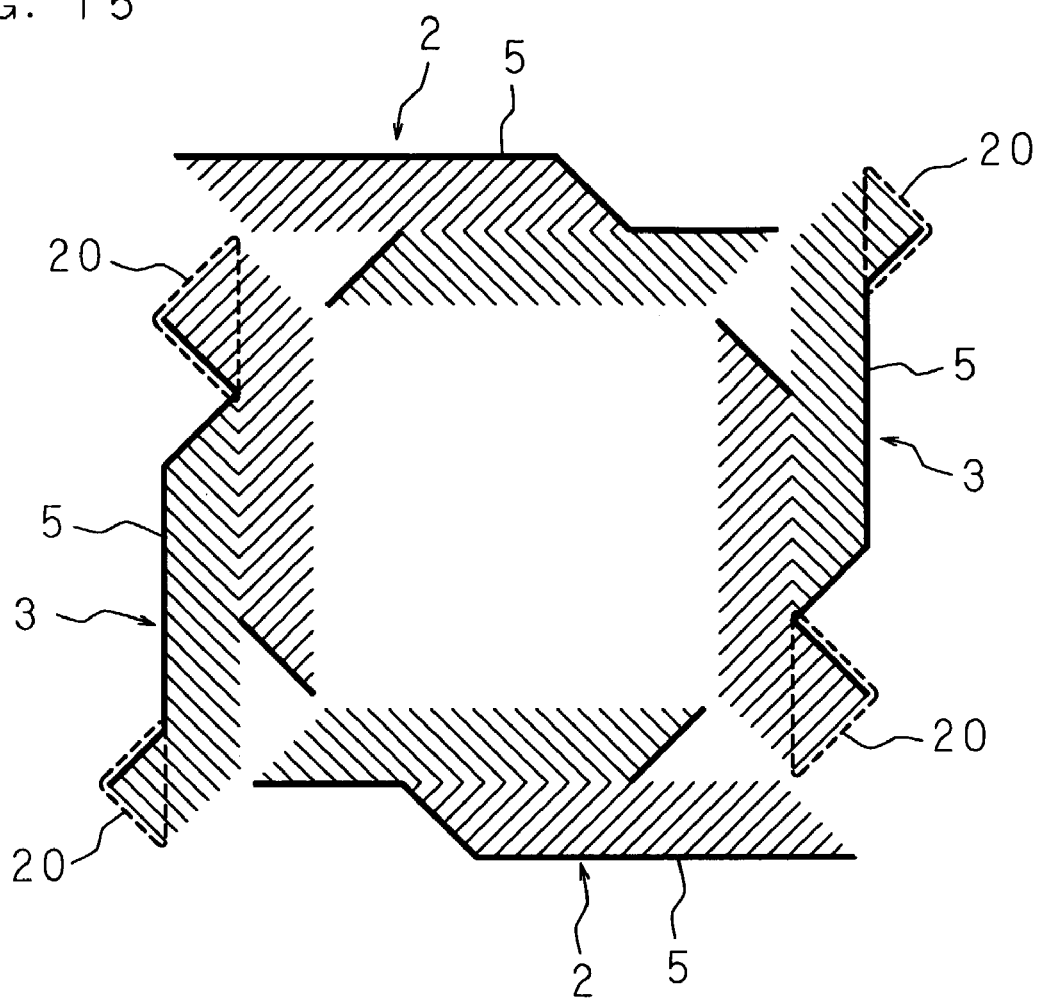
FIG. 15 is a schematic illustration of a touch panel device of the second example of the third embodiment.

FIG. 15 is a schematic view of a touch panel device of the second example of the third embodiment. In this example, for each receiving element 3, two extended portions 20 of the electrode fingers 8 are provided outside the comb-like electrode 5. More specifically, in a region where surface acoustic waves are propagated from the upper-side excitation element 2 and the lower-side excitation element 2 to the right-side receiving element 3, two extended portions 20 are provided outside the comb-like electrode 5 of the right-side receiving element 3. In a region where surface acoustic waves are propagated from the upper-side excitation element 2 and the lower-side excitation element 2 to the left-side receiving element 3, two extended portions 20 are provided outside the comb-like electrode 5 of the left-side receiving element 3.

(Third Embodiment: Third Example)

Figure 16:
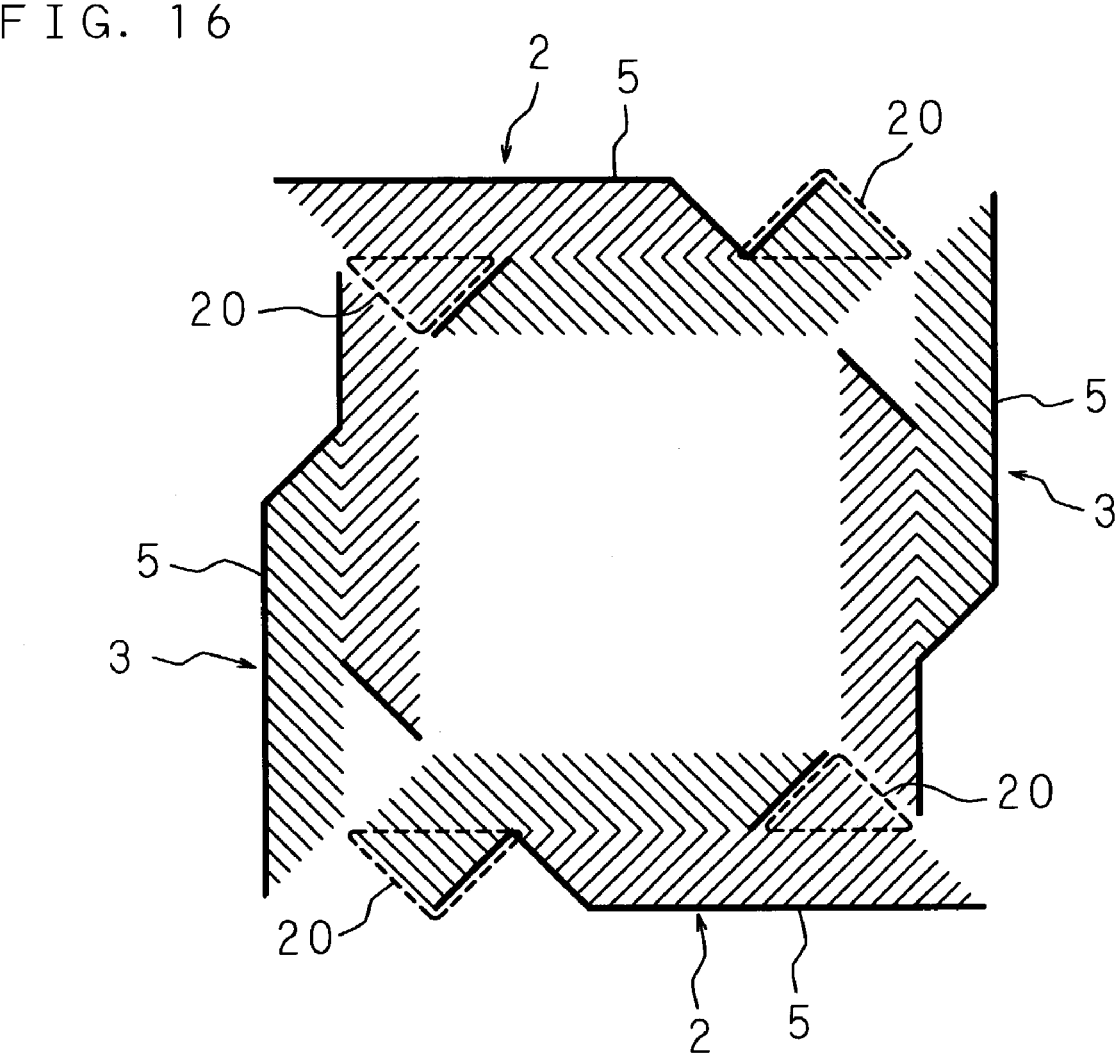
FIG. 16 is a schematic illustration of a touch panel device of the third example of the third embodiment.

FIG. 16 is a schematic view of a touch panel device of the third example of the third embodiment. In this example, for each excitation element 2, two extended portions 20 of the electrode fingers 8 are provided inside and outside the comb-like electrode 5. More specifically, in a region where surface acoustic waves are propagated from the upper-side excitation element 2 to the right-side receiving element 3, an extended portion 20 is provided inside the comb-like electrode 5 of the upper-side excitation element 2. In a region where surface acoustic waves are propagated from the upper-side excitation element 2 to the left-side receiving element 3, an extended portion 20 is provided outside the comb-like electrode 5 of the upper-side excitation element 2. In a region where surface acoustic waves are propagated from the lower-side excitation element 2 to the right-side receiving element 3, an extended portion 20 is provided outside the comb-like electrode 5 of the lower-side excitation element 2. In a region where surface acoustic waves are propagated from the lower-side excitation element 2 to the left-side receiving element 3, an extended portion 20 is provided inside the comb-like electrode 5 of the lower-side excitation element 2.

In the case where the extended portion 20 of the electrode fingers 8 is provided inside the comb-like electrode 5, since the extended portion 20 does not protrude outside, it is not necessary to widen the frame region 1b. On the other hand, in the case where the extended portion 20 of the electrode fingers 8 is provided outside the comb-like electrode 5, unlike the case of providing the extended portion 20 inside the comb-like electrode 5, the time difference can be maintained, the addition effect during excitation and the received signal at the last end have no distortion, and thereby eliminating the necessity of a special process. Hence, by considering such characteristics, a decision can be made as to whether the extended portions 20 of the electrode fingers 8 are provided inside or outside the comb-like electrodes 5. Note that the layouts of the extended portions 20 of the electrode fingers 8 of the first through third examples (FIG. 14 through FIG. 16) are examples, and, needless to say, it is possible to adopt any other layout examples such as a layout in which one extended portion 20 is provided for each of the excitation elements 2 and receiving elements 3 so that the extended portions 20 protrude to the outside.

(Fourth embodiment)

Figure 17:
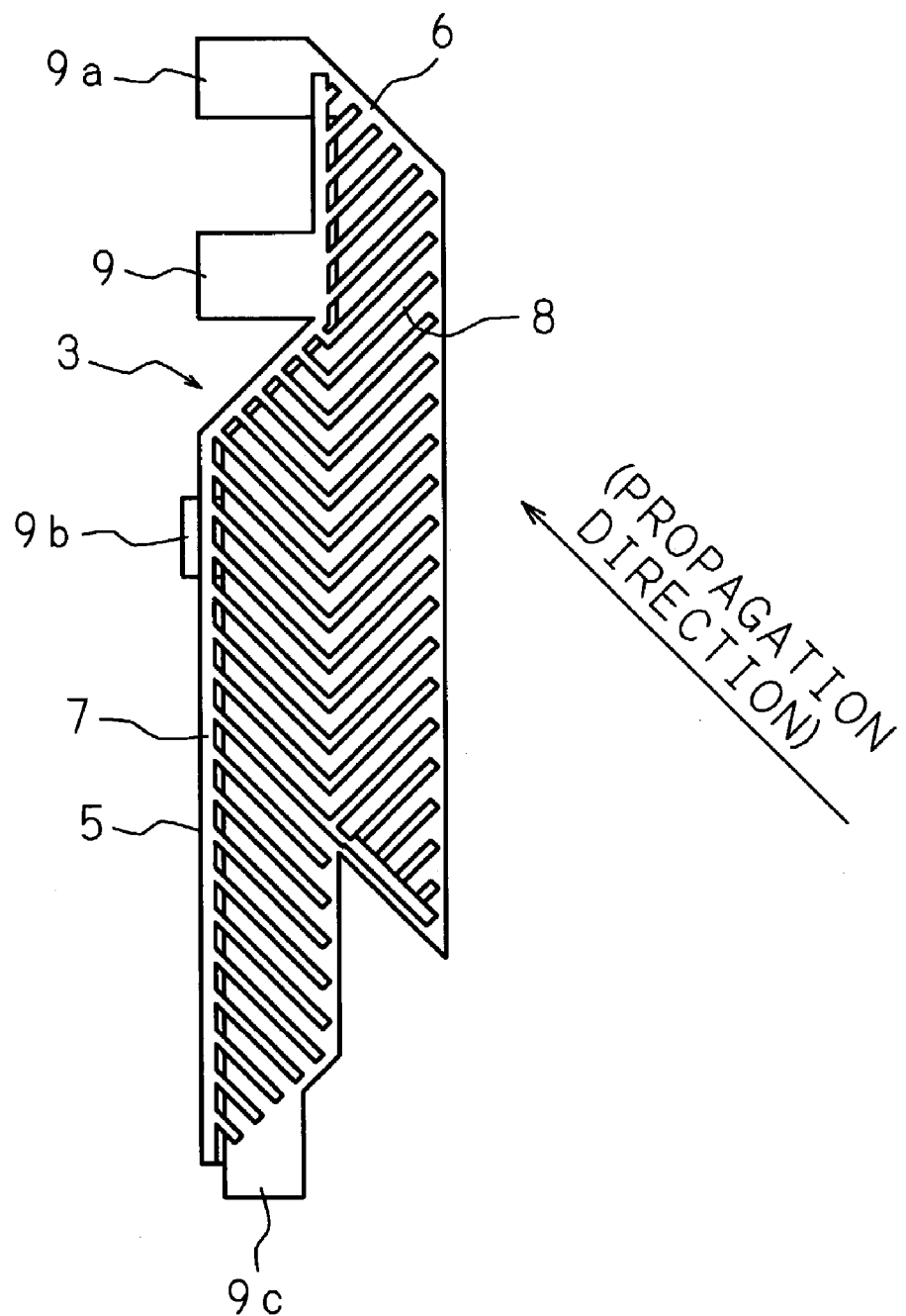
FIG. 17 is an illustration showing the electrode structure of a part (left-side receiving element) of a touch panel device of the fourth embodiment.
Figure 18:
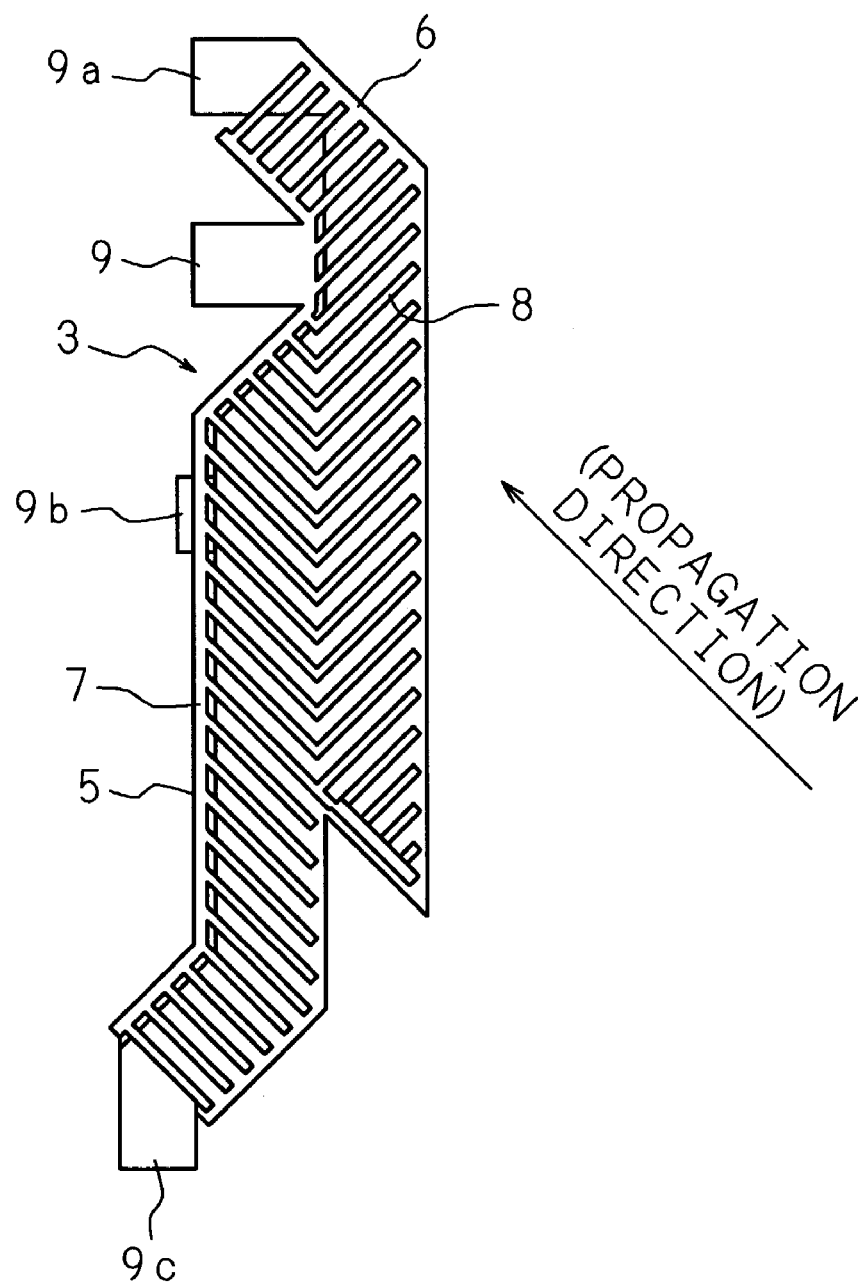
FIG. 18 is an illustration showing the electrode structure of a part (left-side receiving element) of a touch panel device of the fourth embodiment.

Next, considering resistance loss during signal transmission, the following description will explain an embodiment of improving the sensitivity in a region near the diagonal. FIG. 17 and FIG. 18 are illustrations showing the electrode structure of a part (the left-side receiving element 3) of a touch panel device of the fourth embodiment, wherein FIG. 17 represents an example in which the extended portion 20 of the electrode fingers 8 is not provided, and FIG. 18 represents an example in which the extended portion 20 of the electrode fingers 8 is provided. In FIG. 17 and FIG. 18, 9a, 9b and 9c are terminals provided at different positions on the plate electrode 6.

In the case of a touch panel device having an SPT electrode structure, since the plate electrode 6 is thin, the resistance is relatively large, and therefore the problem of signal loss due to the resistance is unavoidable. In other words, when the received signal is transmitted over a long distance on the plate electrode 6, attenuation increases. For example, is the case where surface acoustic waves propagated in an upper-left oblique direction (the arrow direction in the figures) from the lower-side excitation element (not shown) are received by the illustrated receiving element 3, in the upper region, the propagation distance of the surface acoustic waves is long, while, in the lower region, the propagation distance is short.

Therefore, suppose that the terminal of the plate electrode 6 is the upper-side terminal 9a, in a region where the surface acoustic wave propagation distance is long and the propagation loss is large, the transmission distance of the received signal on the plate electrode 6 is short and the transmission loss is small, while, in a region where the surface acoustic wave propagation distance is short and the propagation loss is small, the transmission distance of the received signal on the plate electrode 6 is long and the transmission loss is large. On the other hand, suppose that the terminal of the plate electrode 6 is the lower-side terminal 9c, in a region where the surface acoustic wave propagation distance is long and the propagation loss is large, the transmission distance of the received signal on the plate electrode 6 is long and the transmission loss is large, while, in a region where the surface acoustic wave propagation distance is short and the propagation loss is small, the transmission distance of the received signal on the plate electrode 6 is short and the transmission loss is small.

Figure 19:
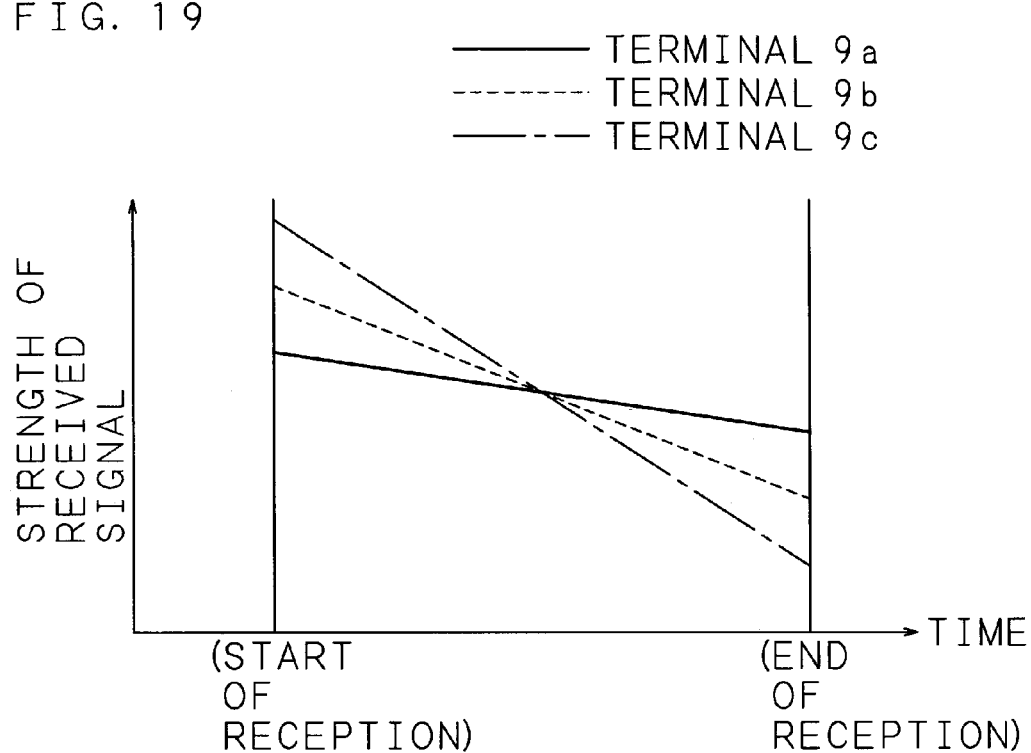
FIG. 19 is a graph showing the strength of received signals of the touch panel device shown in FIG. 17.
Figure 20:
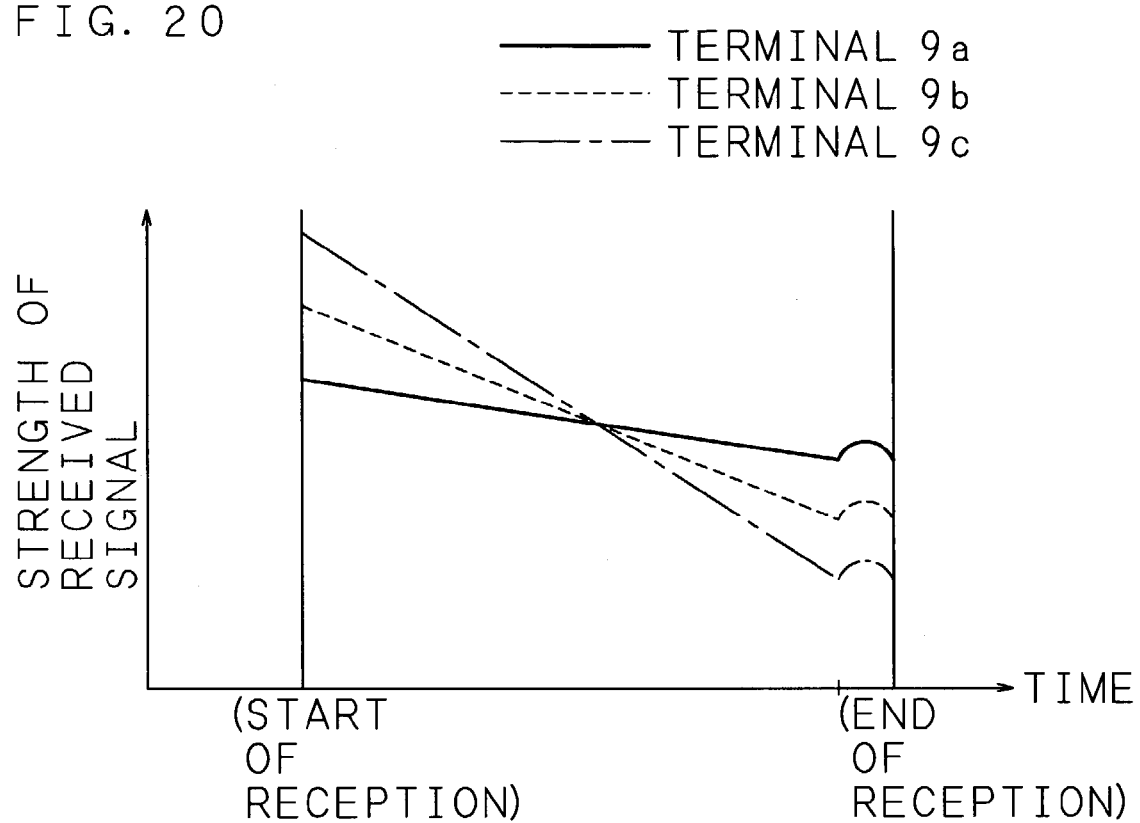
FIG. 20 is a graph showing the strength of received signals of the touch panel device shown in FIG. 18.

Consequently, the results of the strength of the received signals obtained by selecting the terminals 9a, 9b and 9c respectively are as shown in FIG. 19 and FIG. 20. FIG. 19 and FIG. 20 show the characteristics of FIG. 17 and FIG. 18, respectively. In FIG. 19 and FIG. 20, the abscissa indicates a time (proportional to the surface acoustic wave propagation distance), the ordinate indicates the strength of the received signal, and the solid line a, broken line b and alternate long and short dash line c represent the characteristics obtained by selecting the terminals 9a, 9b and 9c, respectively. In the structural example shown in FIG. 18 in which the extended portion 20 of the electrode fingers 8 is provided, an improvement in the strength of the received signal in a region near the diagonal where the propagation distance is longest is recognized at the end of reception by the effect of the extended portion 20 (see FIG. 20).

When the terminal 9c is selected, in the region near the diagonal where the propagation distance is longest, large transmission loss on the plate electrode 6 is added to large propagation loss, and the strength of the received signal becomes extremely low. On the other hand, when the terminal 9a is selected, in the region near the diagonal where the propagation distance is longest, although the propagation loss is large, the strength of the received signal is high because there is almost no transmission loss on the plate electrode 6.

Accordingly, in order to improve the sensitivity in the region near the diagonal where the propagation distance is longest when receiving the surface acoustic waves from the lower-side excitation element 2, it is preferable to select the terminal 9a. On the other hand, when receiving the surface acoustic waves from the upper-side excitation element 2, since the relationship is completely reverse to that for receiving the surface acoustic waves from the lower-side excitation element 2, it is preferable to select the terminal 9c to improve the sensitivity in the region near the diagonal where the propagation distance is longest. Thus, it is preferable to selectively switch the terminal 9a or terminal 9c according to the receiving direction of the surface acoustic waves.

Note that the above-mentioned relationship between the propagation loss and the transmission loss on the receiving side (receiving element 3) is also applicable to the relationship between the propagation loss of the surface acoustic wave and the transmission loss of the excitation signal on the transmission side (Excitation Element 2).

As clear from the above, by inputting the excitation signal or outputting the received signal through a terminal 9 provided in a region where the surface acoustic wave propagation distance is long (region near the diagonal), it is possible to reduce the transmission loss due to the resistance of the plate electrode 6 in the region with the long propagation distance where the influence of the propagation loss of the surface acoustic wave is larger (region near the diagonal) as compared to other regions, and thereby obtain a high sensitivity in the region with the long propagation distance (region near the diagonal).

(Fifth Embodiment)

Figure 21:
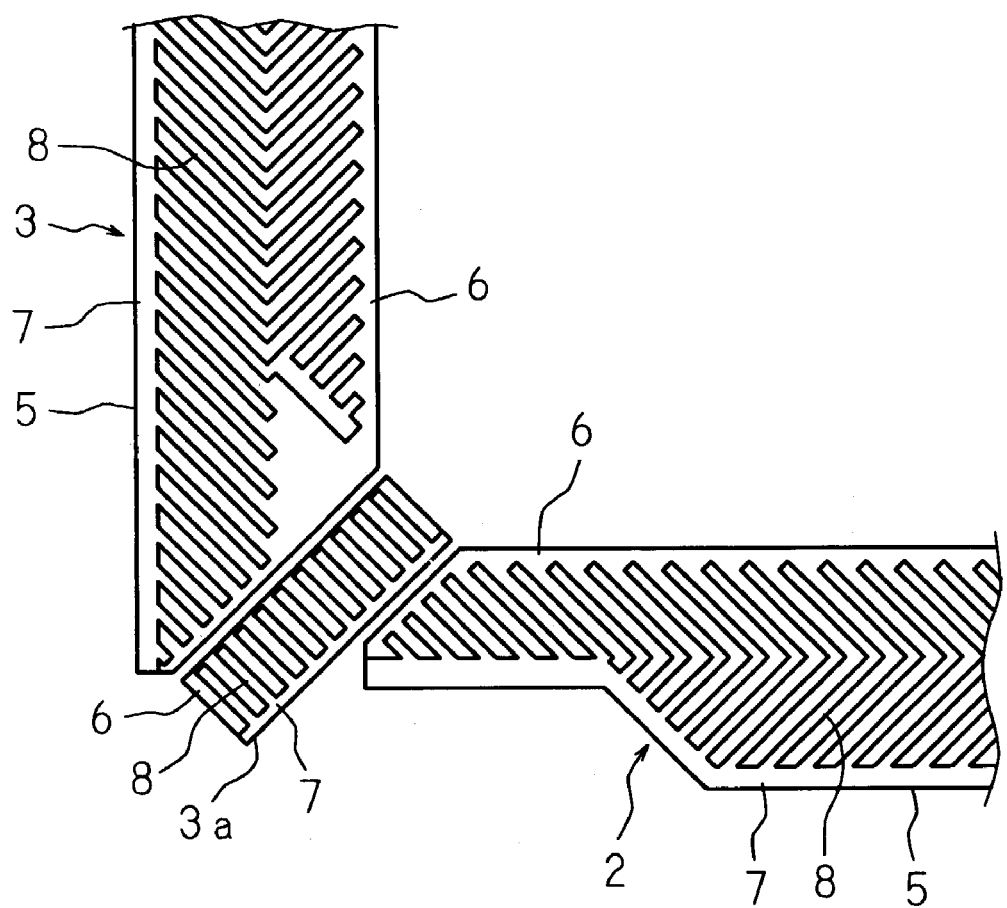
FIG. 21 is an illustration showing the electrode structure of a part of a touch panel device of the fifth embodiment.
Figure 22:
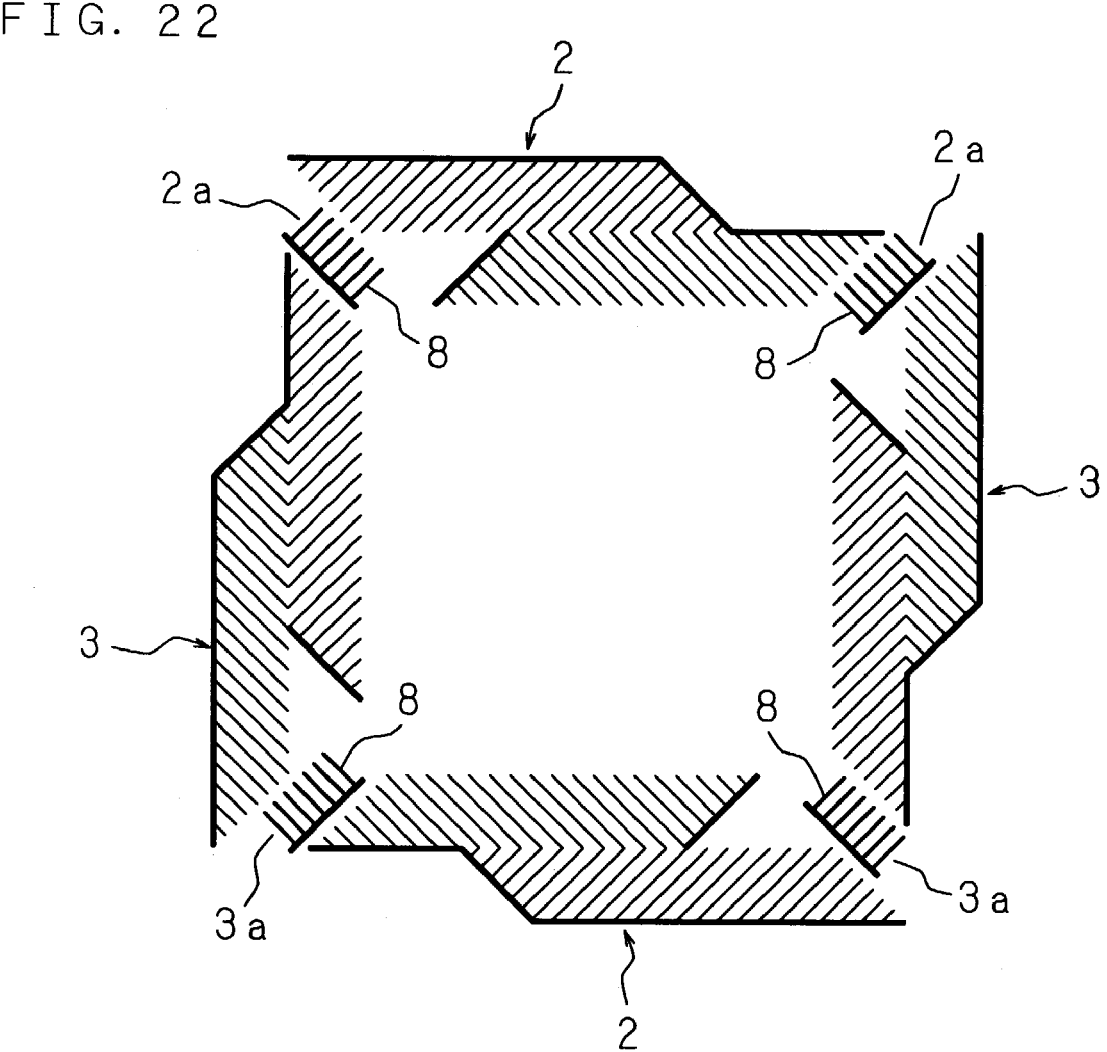
FIG. 22 is a schematic illustration of the touch panel device of the fifth embodiment.

FIG. 21 is an illustration showing the electrode structure of a part of a touch panel device of the fifth embodiment, and FIG. 22 is a schematic illustration of the same touch panel device. In the fifth embodiment, in order to improve the sensitivity in the region near the diagonal where the surface acoustic wave propagation distance is long, excitation elements 2a for exciting surface acoustic waves and receiving elements 3a for receiving surface acoustic waves are additionally provided, independently of the existing excitation elements 2 and receiving elements 3, at the four corners of the frame region to form pairs in the diagonal directions. For example, the excitation elements 2a for exciting surface acoustic waves in a lower-right oblique direction and a lower-left oblique direction are provided at the upper left corner and the upper right corner, respectively, and the receiving elements 3a for receiving surface acoustic waves propagated from an upper-right oblique direction and an upper-left oblique direction are provided at the lower left corner and the lower right corner, respectively.

Note that these additional excitation elements 2a and receiving elements 3a may be driven completely independently of the excitation elements 2 and the receiving elements 3, or driven in an interlocked manner with the excitation elements 2 and the receiving elements 3. In the case of interlock driving, in order to maintain the continuity of signals, it is necessary to make the aperture width of the comb-like electrodes of the excitation elements 2a and receiving elements 3a smaller than the diameter of a pen for pointing at a position. Moreover, it is possible to arrange the additional excitation elements 2a and receiving elements 3a to overlap the existing excitation elements 2 and receiving elements 3. In this case, the detection accuracy can be improved by performing switching according to the need.

Figure 1:
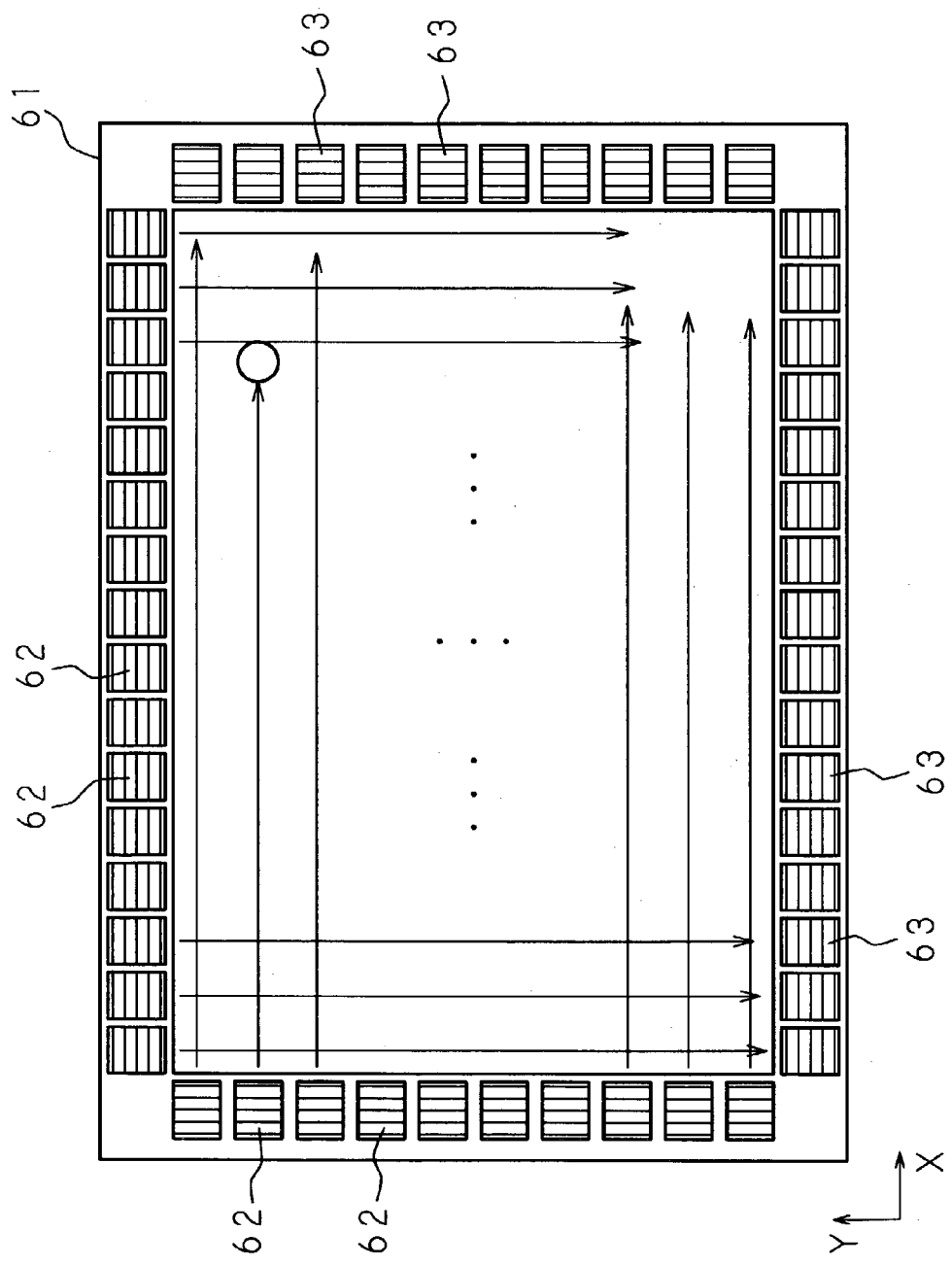
FIG. 1 is an illustration showing the structure of a conventional touch panel device.
Figure 2:
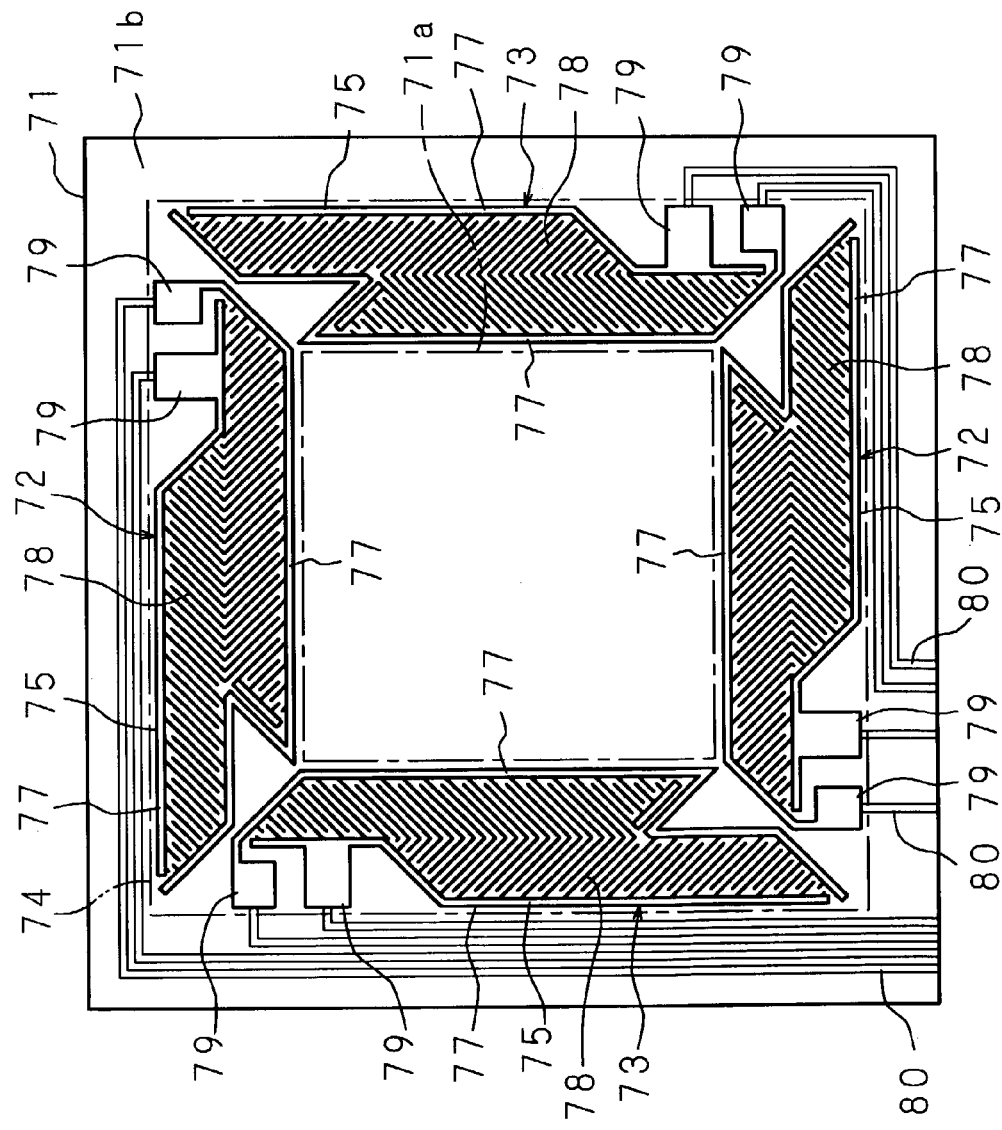
FIG. 2 is an illustration showing the structure of a conventional touch panel device (the first prior art example)
Figure 3:
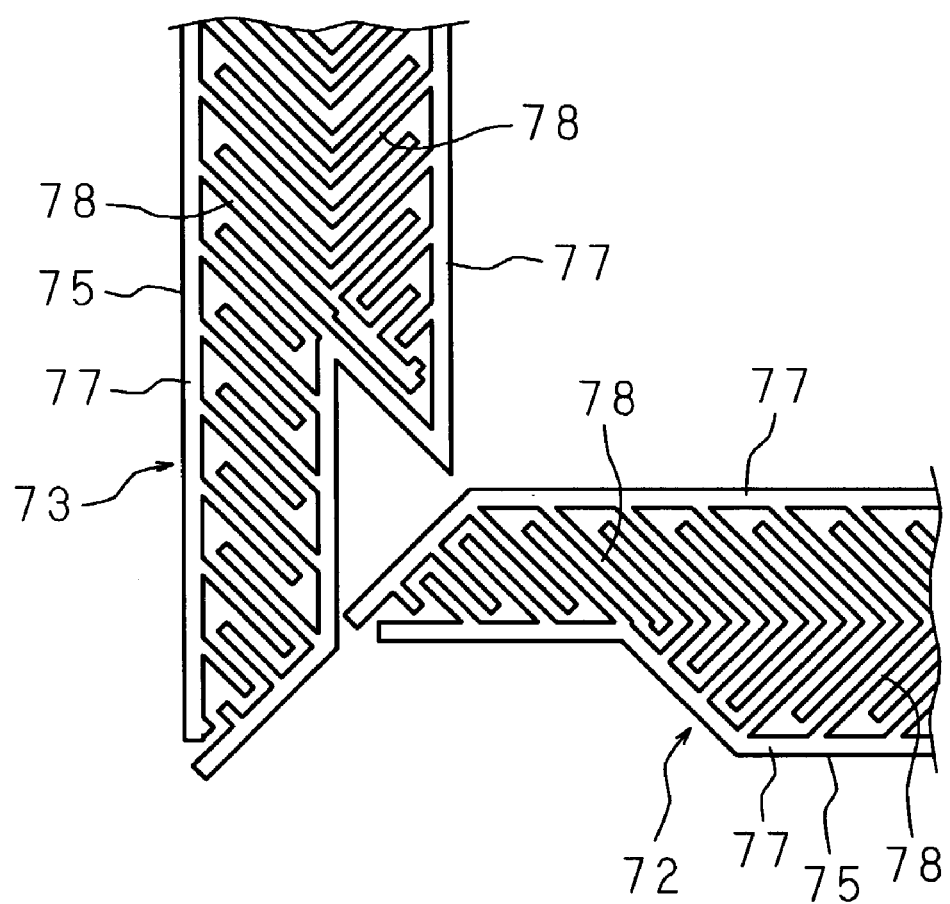
FIG. 3 is an enlarged sectional view of the touch panel device shown in FIG. 2.
Figure 4:
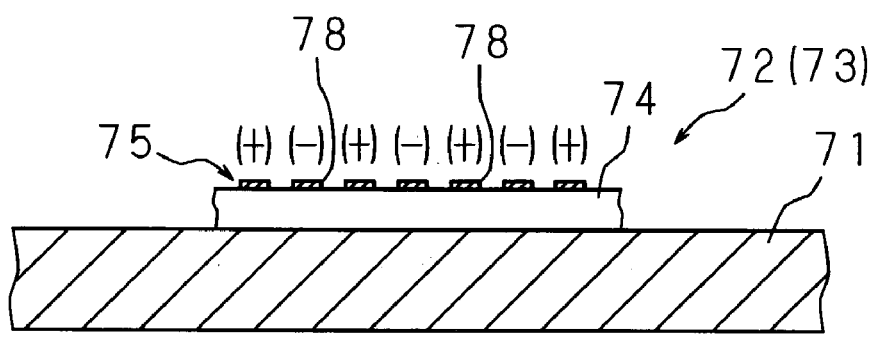
FIG. 4 is a partial cross sectional view of an excitation element or a receiving element of the touch panel device shown in FIG. 2.

Note that, in the above-described embodiments, while the touch panel device having the SPT electrode structure (the second prior art example) is explained as an embodiment, it is, of course, possible to similarly apply the present invention to all touch panel devices which are constructed to propagate surface acoustic waves in the diagonal directions of the substrate, including a touch panel device (the first prior art example) as shown in FIG. 2.

As described in detail above, in the touch panel device of the present invention, since the widths of the electrode fingers of the excitation elements and/or the receiving elements are increased according to an increase in the surface acoustic wave propagation distance, it is possible to realize a high S/N ratio in a region with long surface acoustic wave propagation distance (region near the diagonal).

Moreover, in the touch panel device of the present invention, since the number of pairs of the electrode fingers of the excitation elements and/or the receiving elements is increased and/or the aperture width of the comb-like electrode of the excitation elements and/or the receiving elements is increased according to an increase in the surface acoustic wave propagation distance, it is possible to realize a high S/N ratio in the region with long surface acoustic wave propagation distance (region near the diagonal).

Furthermore, in the touch panel device of the present invention, since excitation signals are inputted or received signals are outputted through a terminal provided in a region with long surface acoustic wave propagation distance (region near the diagonal), it is possible to realize a high S/N ratio in the region with long surface acoustic wave propagation distance (region near the diagonal).

Besides, in the touch panel device of the present invention, since excitation elements and receiving elements that form pairs in the diagonal directions are additionally provided at the four corners of the substrate, it is possible to realize a high S/N ratio in the region with long surface acoustic wave propagation distance (region near the diagonal).

In addition, since the touch panel device of the present invention is designed to have an SPT electrode structure in which the comb-like electrode is formed on one surface of the piezoelectric body and the plate electrode is formed on the other surface thereof, it is possible to narrow the frame region, improve the degree of freedom in design of the electrodes, and easily ensure a high S/N ratio in the region with long surface acoustic wave propagation distance (region near the diagonal).

Thus, in the touch panel device of the present invention, since a high sensitivity can be realized even in a region with long surface acoustic wave propagation distance (region near the diagonal), it is possible to improve the accuracy of detecting the presence or absence of contact of an object and the contact position.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:
1. A touch panel device comprising:
a rectangular substrate; and
excitation elements for exciting surface acoustic waves and receiving elements for receiving surface acoustic waves, said excitation elements and said receiving elements being disposed at peripheral sections in diagonal directions of said substrate to form pairs,
wherein surface acoustic waves are propagated between said excitation elements and said receiving elements in diagonal directions on said substrate, and a position of an object in contact with said substrate is detected based on received results at said receiving elements, and
wherein said excitation elements and said receiving elements have comb-like electrode fingers, and widths of said comb-like electrode fingers of said excitation elements and/or said receiving elements are set according to lengths of propagation distances of the surface acoustic waves.
2. The touch panel device of claim 1,
wherein each of said excitation elements and said receiving elements comprises a film-like piezoelectric body, a comb-like electrode formed on one surface of said piezoelectric body, and a plate electrode formed on the other surface of said piezoelectric body.

* * * * *